Feb. 26, 1963  C. K. STARKS ET AL  3,079,502
METHOD AND MEANS FOR PHOTOGRAPHING AREAS
OF LIMITED ACCESSIBILITY
Filed April 3, 1958  3 Sheets-Sheet 1
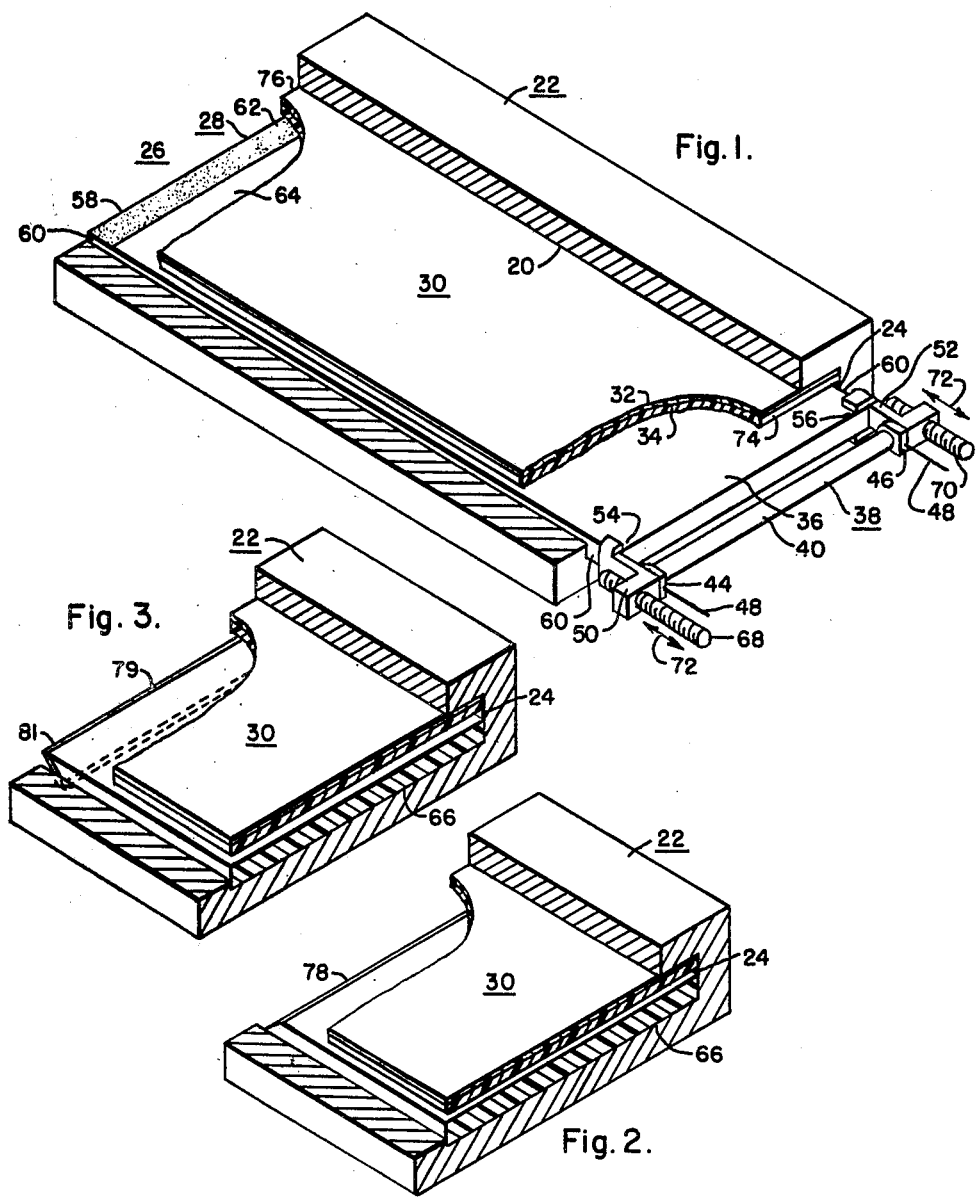
WITNESSES:
Bernard R. Giegney
Leon M. Garman
INVENTORS
Cecil K. Starks and
Norman L. Carroll.
BY Donald J. Smith
ATTORNEY Feb. 26, 1963 C. K. STARKS ET AL 3,079,502
METHOD AND MEANS FOR PHOTOGRAPHING AREAS
OF LIMITED ACCESSIBILITY
Filed April 3, 1958 3 Sheets-Sheet 3

United States Patent Office 3,079,502
Patented Feb. 26, 1963

3,079,502
METHOD AND MEANS FOR PHOTOGRAPHING AREAS OF LIMITED ACCESSIBILITY
Cecil K. Starks, Oakmont, and Norman L. Carroll, Richland Township, Allegheny County, Pa., assignors to Westinghouse Electric Corporation, East Pittsburgh, Pa., a corporation of Pennsylvania
Filed Apr. 3, 1958, Ser. No. 726,129
15 Claims. (Cl. 250—65)

The present invention relates to photographic film and light-source arrangements for photographing the interior surfaces of narrow or otherwise confined passages, enclosures and the like, and more particularly to method and means for making photographs for purposes of inspecting or testing the aforementioned interior surfaces.

Heretofore it has been the practice to use a so-called panoramic camera for photographing the aforementioned interior surfaces. This prior device not only is complicated and expensive, but requires a high intensity light source, mirror, scanning mechanism, various light directing adapters, and optical components, depending upon the applications in which the camera is employed, in addition to the usual camera mechanism.

In the manufacture of various types of reaction vessels, heat exchangers and tubular elements such as heat exchanger tubing, pipes, gun and rifle bores, it is desirable to inspect the internal surfaces thereof for the purposes of ascertaining the presence of any defects which may result from casting, drawing or other manufacturing process. In still other applications, it is necessary that such items be substantially free from corrosion or other interior surface defects before placing the tubular element, vessel or the like into use. One convenient arrangement for so testing the interior surfaces of such items of equipment or components thereof is to photograph directly these interior surfaces and to determine from the resultant photograph the presence of corrosion or other surface defect as expressed in terms of relative exposure of the photographic film.

In accordance with the invention, a method and means are disclosed for conveniently exposing a photographic film placed adjacent these interior surfaces by the reflection of light therefrom. If, of course, the aforesaid interior surfaces are relatively free from surface defects, the reflected light will be substantially uniform and the comparative absence of variations in the exposed film will indicate that the interior or other surface being tested or inspected is free of surface defects. On the other hand, the presence of corrosion, erosion, cracks, blow holes or the like at such surfaces will reduce or otherwise change the amount of light reflected, thereby causing the photographic film to be variably exposed and thereby to indicate the presence of one or more of the aforementioned surface defects. As will be explained hereinafter more fully, the invention is equally applicable to any flat or curved surface, and particularly adapted for use with those surfaces of limited accessibility.

In view of the foregoing, an object of the invention is the provision of a novel and efficient method for photographing interior surfaces, particularly those of limited accessibility.

Another object of the invention is the provision of a novel and efficient means adapted for photographing the aforementioned interior areas.

Further objects of the invention are the provision of a means and method for photographing relatively large surface areas of either flat or non-planar contour.

Still other objects of the invention are the provision of novel combinations of a photographic film and light sources therefor arranged particularly for photographing interior surfaces or other surfaces of limited accessibility.

A still further object of the invention is the provision of a novel and efficient light source adapted for use with a photographic film.

These and other objects, features and advantages of the invention will be made apparent during the forthcoming description of exemplary embodiments of the invention with the description being taken in conjunction with the accompanying drawings, wherein:

FIGURE 1 is an isometric view of a tubular element and a photographic means inserted therein for photographing an interior surface thereof in accordance with the invention with parts of the tubular element and photographing means being broken away for purposes of clarity;

FIG. 2 is a partial isometric view of another form of the light source employed in FIG. 1 of the drawings;

FIG. 3 is a partial isometric view of still another form of the light source employed in FIG. 1;

Figure 4:
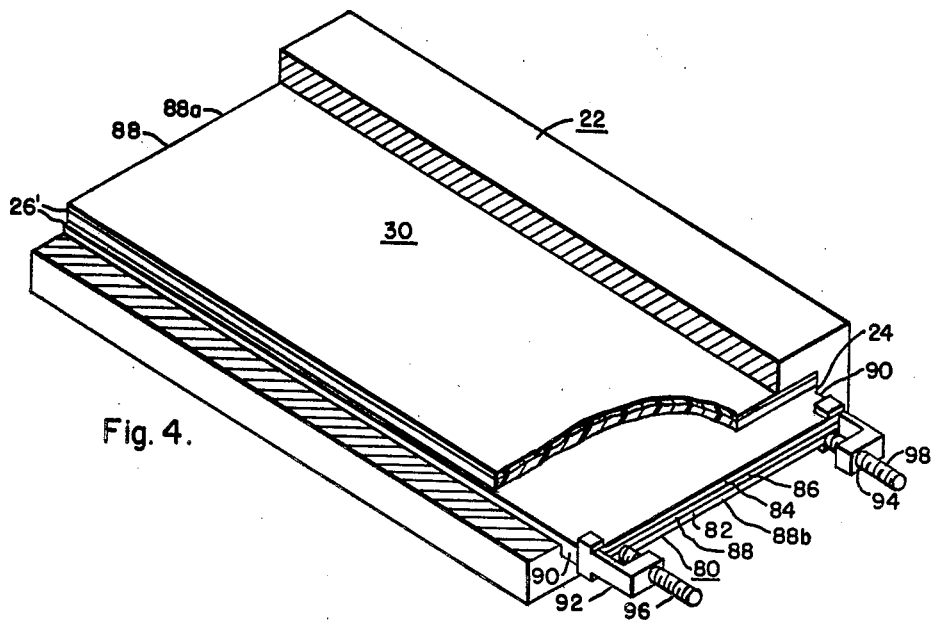
FIG. 4 is an isometric view of another form of the photographing means illustrated in FIG. 1 and arranged in accordance with the invention.

In utilizing the terms, tubular element, cylindrical element and the like, such terms are used in their broad geometric sense, in which there is signified not only a circularly tubular or cylindrical element, but any surface formed by a line moving parallel to itself over a plane curve. In accordance with the specific aspects of this invention, the tubular or cylindrical elements herein are of both circular and rectangular cross section.

Referring now to FIGS. 1 and 2 of the drawings, the illustrative forms of the invention shown therein are adapted for photographing an interior surface area 20 of a generally cylindrical or tubular element 22. In this arrangement of the invention the surface 20 being photographed is a wall of a substantially rectangular cavity 24 formed within the tubular member 22. The tubular member 22 for the purposes of this invention is any form of tubular conduit, for example a flat type heat exchanger tube or any member having a relatively narrow cavity extending therethrough. In accordance with the invention, a photographic means denoted generally by the reference character 26 is inserted within the narrow cavity 24 and is arranged to photograph substantially the entire area of the surface 20 by means of light reflected therefrom onto a conventional photographic film or emulsion.

In furtherance of this purpose, the photographic means 26 comprises a light-transmitting arrangement 28 and a photographic film 30. In this arrangement of the invention the photographic sheet 30 is generally rectangular and desirably is coextensive with the surface area 20 which is being photographed for inspectional or testing purposes. For purposes hereinafter to be described, the photographic film 30 in this arrangement includes a layer 32 of a conventional photographic emulsion which is deposited upon a clear base, for example, a substantially transparent plastic sheet 34, serving as a support for the photographic emulsion. The photographic film 30 is inserted into the cavity 24 to a position adjacent to, and desirably in contact with, the surface 20 being photographed.

The photographic means 26 also includes a light-transmitting arrangement 28 which likewise is insertable into the cavity 24 of the member 22. The light-transmitting arrangement 28 substantially is coextensive with the photographic film 30 and in this arrangement includes a sheet 36 of a light-conducting plastic such as methacrylic resin known as Lucite or Plexiglas. By means presently to be described, the light-conductive sheet 36 is arranged to conduct light from a source 38 to the entire reverse surface of the photographic film 30. The light thus applied to the photographic film 30 passes through the clear plastic supporting sheet or backing 34 of the emulsion 32 and through the emulsion 32 to the surface 20, where it is reflected back onto the photographic emulsion 32. The supporting sheet 34 is therefore fabricated from a clear plastic material such as the aforementioned Lucite in order that the light can pass therethrough. Furthermore, the backing sheet 34, being rather thin, is sufficiently flexible to permit conformance of the photographic film 30 to the surface 20 being photographed. The photographic emulsion 32 likewise is relatively transparent, as is well known, to permit passage of light from the light-conductive sheet 36 therethrough.

Thus, the light from the light-transmitting arrangement 28 is passed uniformly through the photographic film 30 onto the surface 20 being photographed. However, should any imperfections exist at any area of the surface 20 in contact with the photographic film 30, the amount of light reflected from that area back onto the photographic emulsion 32 will be diminished accordingly. With this arrangement, then, the photographic film 30 is doubly exposed as it were: First a uniform exposure to light passing directly through the film 30 from the light-transmitting arrangement 28 and second, a probably variable exposure of light reflected from the surface being photographed back into the film emulsion 32. Since the first exposure is uniform, as aforesaid, the total exposure of the film 30 will reveal any defects in the surface 20 as under or lesser exposed in the film 30 as determined by the nature of the defect causing the reduction in light reflection at the surface 20. Thus, it is possible from the pattern of the resulting exposure of the film 30 to determine the existence and location of any undesirable surface defects and their approximate character, that is to say, whether these defects are surface corrosion, cracks, erosion, blow holes or the like.

The light supplied to the back side of the film 30 by the light-transmitting arrangement 28 is obtained as aforesaid from the light source 38. In this arrangement the light source 28 can be a fluorescent lamp having an elongated tubular bulb 40 extending along the outside edge 42 of the light-conductive sheet 36. Alternatively, the light source 38 can be a linear filament type lamp having substantially the same configuration. The light source 38 is provided with terminals (not shown) at its ends which are inserted into electrical sockets 44 and 46 in a well-known manner. An electric potential is applied thereto through suitable conductors denoted generally by the reference character 48. The electric sockets 44 and 46 are mounted respectively on the confronting surfaces of a pair of brackets 50 and 52. The brackets 50 and 52 are rigidly clamped to the light-conductive sheet 36 adjacent the respective outside corners 54 and 56 of the plastic sheet 36. The light source 38 thus is positioned a predeterminable distance from the outside edge 42 of the light-conductive sheet and therefore, the light supplied from the source 38 to the sheet 36 will be of the same intensity as long as the light source 38 remains unchanged.

Ordinarily, the light supplied to the outer edge 42 of the light-conductive sheet 36 will be conducted substantially in coplanar directions therethrough, and most of the light would be radiated from the opposite edge 58 and the lateral edges 60 of the light-conductive sheet. To prevent loss of light and spurious reflections occasioned thereby, the edges 58 and 60 desirably are coated with a light-reflecting material such as a metallic foil.

In the modification shown in FIG. 1 of the drawings, the light supplied to the plastic sheet 36 by the source 38 is withdrawn from a portion of the plastic sheet facing the back side of the photographic film 30 and disposed adjacent the lower edge of the sheet. This portion which is termed a "window" 62 is formed by etching or peening or by any other convenient abrasional process to impart a rough surface to the window 62. The indentations made into surface 64 of the sheet 36, as a result of the aforementioned abrasional processes, intercept a portion of the light transmitted through the sheet 36 and by diffusion and refraction bends a portion of the light thus intercepted to a direction at an angle to the surface 64 of the light-conductive sheet and to the reverse surface of the film 30.

It is contemplated that the entire adjacent surface 64 of the light conductive sheet, which is coextensive with the photographic film 30, can be arranged as described previously into a light-diffusion window and that the film 30 can be exposed as described above simply by turning on the light source 38 after the film 30 and the light-conductive sheet 36 are positioned as shown in FIG. 1. Although this arrangement will work satisfactorily in many applications, those areas of the film 30 which are closer to the outer edge 42 and the light source 38 will receive progressively greater amounts of light and therefore a uniform first exposure of the film 30 will not be achieved.

Accordingly, in one arrangement of the invention, the diffusional window 62 is confined to a relatively narrow strip extending transversely across the width of the light-conductive sheet 36. The window 62 furthermore is coextensive in its length with the width of the film 30 and is disposed adjacent the inner edge 58 of the light-conductive sheet. A uniform exposure of the film 30 is obtained in accordance with this arrangement of the invention by moving the light-conductive sheet 36 and light source 38 secured thereto longitudinally of the film 30 after the latter is positioned within the cavity 24. In one application where the member having the cavity 24 is disposed in a substantially horizontal position, the plastic sheet 36 is rested upon a lower surface 66 of the cavity (FIG. 2) while the film 30 is placed against the upper surface 20. Means are then provided for moving the light conductive sheet 36 at a controlled rate longitudinally of the film 30 to cause the window 62 to scan the entire reverse surface of the film 30, whereby light emitted from the window 62 thereof is applied uniformly along the length and width of the film 30.

One arrangement for so moving the sheet 36 includes a pair of screw drive members 68 and 70 which are threaded into tapped apertures of the light source mounting brackets 50 and 52, respectively. The screw members 68 and 70 are mounted for rotation about their longitudinal axes, respectively, in a well known manner, and the application of torque to the drive members 68 and 70 causes longitudinal displacement of the light conductive sheet 36 by engagement of its brackets with the screw members 68 and 70, as indicated by arrows 72. By so moving the light-conductive sheet 36, it will be seen that the same amount of light is applied to those areas adjacent the outside edge 74 of the film 30 as is applied to those areas adjacent the inside edge 76 thereof. This follows from the fact that the source 38 is moved with the window 62 and that the light transmitted from the source 38 to the back side of the film 30 through the window 62 follows a light-conductive path of substantially constant length.

Referring now more particularly to FIG. 2 of the drawings, the arrangement disclosed and described heretofore in connection with FIG. 1 is modified in that the light diffusing window 62 is omitted and light passing through the light-conductive sheet 36 is refracted at the inward edge thereof by means of a beveled edge portion 78. The light thus refracted from the lower edge 78 (FIG. 2) need not pass perpendicularly through the film 30 as long as at least a portion of the light rays are bent toward the back side of the film 30, and the limits of travel of the light-conductive sheet are selected accordingly so that the entire surface of the photographic emulsion 32 is scanned or traversed by the light refracted from the beveled edge portion 78.

Alternatively as shown in FIG. 3, the refracting beveled edge portion 78 of FIG. 2 can be replaced by a mirrored edge portion 79 likewise formed at that end of the sheet 36 which is opposite from the light source 38. In the latter arrangement, however, the edge 79 is beveled in the opposite relative direction and is disposed desirably at a 45° angle such that the light being conducted longitudinally through the sheet member 36 will be reflected substantially perpendicularly thereto and will pass perpendicularly through the transparent film 30. In furtherance of this purpose, the beveled edge 79 of FIG. 3 is provided with a mirror deposit 81 of silver or the like to provide a reflective backing surface for the edge 79.

Referring now to FIG. 4 of the drawings, a modified form of photographic means 26' is illustrated therein. The photographic means 26' likewise is adapted for operation within the cavity 24 of the tubular member 22. In this arrangement of the invention, the photographic means 26' includes the film 30 described previously and a light source denoted generally by the reference character 80. In this arrangement of the invention the light source 80 is substantially coextensive with the film 30 and comprises a supporting member or layer 82 and a phosphorescent screen 84. In an exemplary arrangement, the screen 84 includes cadmium sulphide which fluoresces when irradiated with alpha particles from a suitably radioactive source, for example, polonium or radium. In the case of polonium, only a very small amount of radioactive isotope is required and this may be disposed adjacent the phosphorescent layer 84 in the form of a very thin layer 86 sandwiched between the phosphorescent material 84 and the supporting member 82. Alternatively, the layer 86 can be omitted and the radioactive material thereof can be mixed uniformly with the phosphor material comprising the layer 84.

The supporting member or sheet 82 desirably is fabricated from an opaque, flexible, desirably reflective material, for example, a relatively thin, metallized sheet of Lucite, in order to prevent loss of light from the reverse side of the light source 80. Similarly, the edges 88 and 90 of the light source 80 can be covered with a suitable opaque backing material, such as that used in commercial photographic preparations, to prevent the emission of light from these edge surfaces and spurious reflections from adjacent portions of the channel 24, which may be induced thereby.

In this arrangement it will be apparent that the light source 80 will be energized continually throughout the effective life of the aforementioned radioisotope, which in the case of polonium is about 60 days. Therefore, it will be impossible to expose the photographic film 30 simply by turning the light source 80 on and off, so to speak. Consequently, in this arrangement of the invention the light source 80 is inserted at one end of the channel or cavity 24 and removed from the other end thereof at a controlled rate in order to provide uniform exposure of the film 30. Stating the matter differently, the light source 80 is inserted and withdrawn at the same speed such that its leading edge 88a will move longitudinally of the film 30 at the same constant speed when inserting the light source 80, as the trailing edge 88b will be moved during withdrawal of the light source 80 from the opposite end of the cavity 24. However, once the light source 80 has been inserted within the cavity 24 to a position whereat it is substantially coextensive with the film 30, as illustrated in FIG. 3, the light source 80 can be held in this stationary position for as long a time as is required for proper exposure of the film 30.

In furtherance of this purpose, a pair of brackets 92 and 94 are secured at spaced locations to the trailing edge 88b of the source 80. A suitable pair of handles or other driving means 96 and 98 are rigidly secured to the brackets 92 and 94 respectively for moving the light source 80 during insertion and withdrawal thereof relative to the channel 24. The handles 96 and 98 can be operated manually, if desired, and are of sufficient length to enable an operator to push the light source 80 into one end of the channel 24 and out of the opposite end thereof. Alternatively, the light source 80 can be moved by any suitable well-known device (not shown) arranged to impart linear movement to the handles or driving means 96 and 98. In the latter case, the light source 80 can be moved by the aforementioned linear motion device at a sufficiently slow rate so that the film 30 is exposed while the light source 80 is being inserted at one end of the channel and withdrawn for the other end thereof in a continuous operation. In one arrangement of the invention, wherein the light source 80 is moved continuously and a CdS-polonium screen was employed, a speed of approximately two inches per minute has been found to provide sufficient exposure of the film 30.

Figure 5:
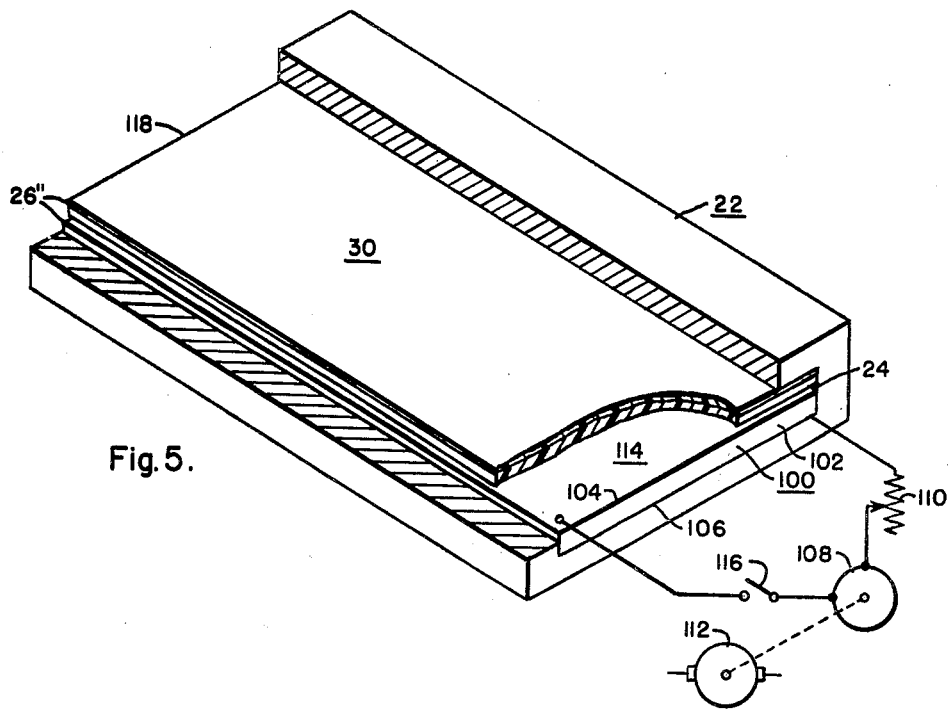
FIG. 5 is an isometric view of still another form of photographic means arranged in accordance with the invention.

Referring now to FIG. 5 of the drawings, another form of photographic means 26" is illustrated therein for use in conjunction with the tubular member 22. The photographic means 26" likewise includes the photographic film 30 which is inserted into the cavity 24 in the manner described heretofore. The photographic means 26" comprises in addition a light source 100 which as in the case of previous forms of the invention, is adapted for insertion with the film 30 into a relatively narrow channel 24. In this arrangement the light source 100 is an electroluminescent panel of known design, such as that described in copending applications of Charles W. Lewis, "Electroluminescent Lamp Structure," filed May 6, 1957, Serial No. 657,356 and "Electrical Apparatus and Solid Dielectric Therefor," filed March 14, 1956, Serial No. 571,536, both applications being assigned to the present assignee. Briefly, the electroluminescent panel or light source 100 comprises a dielectric layer 102 which is coated on opposing side surfaces with electrode layers 104 and 106. The dielectric layer 102 can be fabricated from glass or if flexibility of the light source 100 is desired, the dielectric material 102 can be fabricated from a clear plastic dielectric material such as Lucite. The electrodes 104 and 106 can be evaporated upon or otherwise deposited as a very thin film upon the dielectric layer 102 such that light developed by the electroluminescent panel 100 can pass through the electrode coating 104 to the film 30 with the result that the film 30 is exposed in much the same manner as that described heretofore in connection with FIG. 1 of the drawings. Embedded within the dielectric material 102 is an electroluminescent phosphor material such as that described in the aforesaid copending applications and which is dispersed coextensively with the film 30.

When an alternating potential is applied to the electrode layers 104 and 106 from a suitable source 108, the fluctuations of the electrostatic field developed between the electrodes 104 and 106 causes the embedded phosphor to glow. The brightness of the light emitted from the phosphor is determined by the voltage applied across the electrodes 104 and 106, while the color or frequency of the emitted light is dependent upon the frequency of the alternating potential applied thereto. Accordingly, the voltage output of the alternator 108 is adjusted by potentiometer 110 and the frequency of the applied potential is controlled by suitably adjusting the speed of the driving motor 112 for the alternator 108 such that the brightness and color of the emitted light matches the sensitivity of one of the commercially available photographic films described below. Inasmuch as the entire surface 114 of the electroluminescent panel 100 will radiate light uniformly to the film 30, and as the light emitted therefrom can be turned on and off simply by actuation of the switch 116, the photographic film 30 and the light source 100 can be inserted as a unit into the channel 24 following which the panel 100 can be energized for a time sufficient to expose the photographic film 30 in the manner described heretofore in connection with FIGS. 1 and 2 of the drawings. In furtherance of this purpose, the edges of the film 30 and the panel 100 can be bound together by the opaque covering 118 described hereinafter in connection with FIG. 6 of the drawings to prevent, in addition, the emission of light from these edges. The conservation of light can be improved still further by providing a relatively heavy electrodal film 106 on the outward surface of the panel 100 to prevent emission of light from the surface and to serve as a reflector to direct the light toward the film 30.

Figures 6, 7, 8:
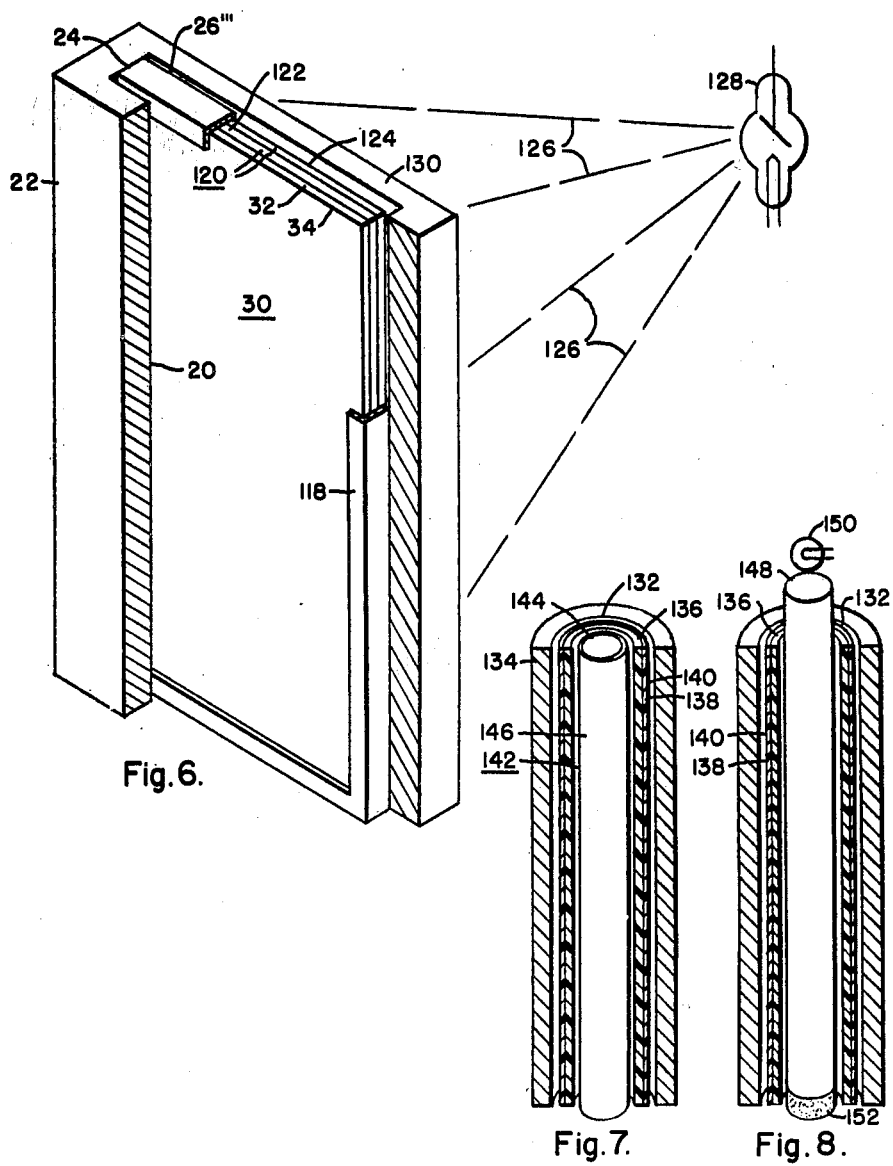
FIG. 6 is an isometric view of yet another form of the photographic means arranged in accordance with the teachings of this invention.
FIG. 7 is a partial isometric view of the bore of a gun or rifle or the like and a photographic means arranged in accordance with the invention for photographing an interior surface of arcuate or other non-planar configuration.
FIG. 8 is a partial isometric view of another form of the photographic means illustrated in FIG. 7.

Another exemplary form of the invention is illustrated in FIG. 6 of the drawings. In the latter arrangement, the photographic means 26''', including the film 30 and a light source denoted generally by the reference character 120, is inserted as a unit into the channel 24 of the tubular member 22. As described heretofore, the film 30 comprises a photographic emulsion 32 and a transparent backing sheet or member 34, with the photographic emulsion being disposed adjacent the interior surface 20 which is being photographed. The film 30 is placed upon a phosphorescent screen comprising the light source 120 and including a layer of phosphorescent material 122 such as zinc sulfide or zinc-cadmium sulfide in a suitable support 124. In FIG. 6 the thickness of these layers has been somewhat exaggerated, and it is to be understood that the photographic means 26''' can be made relatively thin for use in narrow channels and for imparting flexibility thereto in the event that a non-planar surface is being photographed.

In accordance with the form of the invention exemplified in FIG. 6, the phosphorescent layer 122 is adapted to be energized by X-rays 126 emitted from a known type of cathode ray tube 128. In this application, assuming that that portion 130 of the tubular element 20 which is disposed between the phosphorescent or X-ray screen 120 is in the order of two inches in thickness, soft X-rays, that is to say, X-rays of comparatively small penetrating power, can be employed. In this arrangement the X-rays were produced by the application of a potential of 125 kilovolts at 10 milliamperes to the cathode ray tube 128.

The exposure time for the film 30 can be controlled readily simply by energizing and deenergizing the X-ray tube 128. This follows from the fact that the X-ray phosphors noted heretofore are standard, short-persistence X-ray screen materials. When using these phosphors, any orthochromatic or panchromatic commercially available film can be used with a yellow-green phosphor such as zinc sulphide. An example of these latter-mentioned films is "Microfil" which is made with a transparent base by the Eastman Kodak Company, Rochester, New York, and "Photolith," also having a clear base made by E. I. Du Pont de Nemours and Company, Wilmington, Delaware. Any commercially available blue-sensitive film provided with a transparent base likewise can be utilized if a blue phosphor is employed for the X-ray screen 122.

The foregoing considerations as to color of film and light sources applies equally to the embodiments of the invention illustrated in FIGS. 1 to 4 of the drawings.

Referring now to FIG. 7 of the drawings, the photographic means disclosed by the invention is depicted therein as adapted for use within a cylindrical channel such as a bore 132 of a rifle or gun barrel 134. In this arrangement of the invention a photographic film 136 is shaped into a cylinder which closely conforms to the inner surface or bore 132 of the barrel 134. The film 136 comprises a transparent cylindrical supporting membe 138 fabricated desirably from a clear plastic such as Lucite and a photographic emulsion 140 deposited uniformly over the external surface of the supporting cylinder 138. Inserted within the cylindrical film support 138 is a cylindrical light source 142.

One form of the light source 142 includes a supporting rod 144 which can be fabricated desirably from a plastic or glass material. Covering the entire outer surface of the rod 144 is a coating of a suitable phosphor material 146. The individual particles of the phosphor layer 146 desirably may be partially or completely embedded in the surface of the supporting rod 144 if formed from a glass or plastic to improve the handling characteristics of the light source 142. The phosphorescent coating 146 can be energized, for example, by means of X-rays in the manner described in connection with FIG. 5 or by means of a radioactive material such as described in connection with FIG. 3 of the drawings.

Alternatively, as shown in FIG. 8, the light source 142 can be replaced by a rod 148 of light-conducting material such as Lucite or Flexiglas. In the latter case a suitable light source 150 is secured adjacent an end of the rod 148 and a light-diffusional band 152 is imparted to the surface of the light-conductive rod 148 adjacent the other end thereof. This latter-mentioned arrangement of the invention then will operate in much the same manner as that described in connection with FIG. 1 of the drawings, with the light-conductive rod 148 being moved either manually or by driving means similar to that illustrated in FIG. 1.

From the foregoing it will be apparent that a novel and efficient means has been disclosed herein for photographing areas of limited accessibility, particularly the inner surfaces of flat or round tubular members. It will be obvious that such uses can be extended readily to applications involving the photographing of the interiors of pipes and other conduits or the interiors of reactional vessels employed for various chemical processes or the like inasmuch as the film 30 and the various light sources utilized therefor are readily flexible or deformable to permit the film 30 or 136 to conform to the contour of the surface being photographed.

The foregoing illustrative and descriptive materials have been employed merely for purposes of exemplifying the invention and are not to be interpreted as limitative thereof. Therefore, numerous additional embodiments or forms of the invention will occur to those skilled in the art without departing from the spirit and scope of the invention. Moreover, it is to be understood that certain features of the invention can be employed without a corresponding use of other features thereof.

Accordingly, what is claimed as new is:

1. In combination, a member having a reflective surface to be photographed, a substantially transparent photographic film adapted to be placed adjacent one side of said surface being photographed, a light-conductive sheet member mounted adjacent the other side of said film and substantially coextending therewith, a light source mounted adjacent an end of said light-conductive member, light-deflecting means disposed adjacent the opposite end of said light-conductive member for directing light from said member to said film, and means for moving said light-conductive member and said light-deflecting means to cause said light-deflecting means to traverse said film so that light passes through said film and is reflected at least partially from said surface to expose further said film.

2. In combination, a member having a reflective surface to be photographed, a substantially transparent photographic film having one side thereof positioned adjacent said surface, a light-conductive sheet member mounted adjacent the other side of said film, a light source mounted adjacent one edge of said sheet member, the opposite edge of said sheet member being beveled inwardly relative to said film to refract the light conducted through said sheet member and issuing from said last-mentioned edge toward said photographic film so that light passes through said film and is reflected at least partially from said surface to expose further said film, and means for moving said sheet member to cause said edge to traverse said photographic film.

3. In combination, a member having a reflective surface to be photographed, a substantially transparent photographic film having one side thereof disposed adjacent said surface, a light-conductive sheet member mounted adjacent the other side of said film and coextending therewith, a light source mounted adjacent one end of said sheet member, the opposite edge of said sheet member being beveled outwardly from said film, light reflective material deposited on said outwardly beveled edge to reflect light being conducted through said sheet member toward and through said photographic film, and means for moving said sheet member to cause said light reflective material to traverse said film.

4. Means for photographing the entire inner reflective surface of a tubular member, said means comprising a substantially transparent tubular photographic film having substantially the same contour as that of said tubular internal surface so that said photographic film can be inserted within said tubular member and disposed adjacent the internal surface thereof, a light-conductive member inserted within said tubular film and conforming generally to the inner periphery thereof, said light-conductive member coextending with the length of said film, a light source disposed adjacent one end of said light-conductive member, and light-directing means disposed at the other end of said member for directing light being conducted through said member toward the inner circumference of said tubular film so that light passes through said film and is reflected at least partially from said surface to expose further said film, and means for moving said member and said light-directing means to cause said light-directing means to traverse the interior of said tubular film.

5. In combination, a member having a reflective surface to be photographed, a substantially transparent photographic film having one side thereof positioned adjacent said surface, a phosphorescent screen mounted adjacent the opposite side of said film and substantially coextending therewith, and means for energizing said screen so that light passes through said film and is reflected at least partially from said surface to expose further said film.

6. In combination, a member having a reflective surface to be photographed, a substantially transparent photographic film having one side thereof positioned adjacent said surface, a light source including a supporting member mounted adjacent the opposite side of said film and coextending therewith, a layer of phosphorescent material deposited uniformly on said supporting member and coextending therewith, and means for energizing said phosphorescent material so that light passes through said film and is reflected at least partially from said surface to expose further said film, said means including a quantity of radioactive isotope disposed uniformly adjacent said phosphorescent layer.

7. In combination, a member having a reflective surface to be photographed, a substantially transparent photographic film having one side thereof positioned adjacent said surface, a light source including a supporting member mounted adjacent the opposite side of said film and substantially coextending therewith, a layer of phosphorescent material deposited uniformly on at least a portion of said supporting member, means for energizing said phosphorescent material so that light passes through said film and is reflected at least partially from said surface to expose further said film, said means including a quantity of radioactive isotope disposed uniformly adjacent said phosphor layer, and means for moving said light source relative to said photographic film.

8. In combination, a member having a reflective surface to be photographed, a substantially transparent photographic film having one side thereof positioned adjacent said surface, a light source including a supporting member mounted adjacent the opposite side of said film and coextending therewith, a layer of phosphorescent material deposited uniformly on said supporting member and coextending therewith, means for energizing said phosphorescent material, said means including an X-ray tube spacedly disposed from said light source and arranged to irradiate said source with X-rays to energize said source so that light passes through said film and is reflected at least partially from said surface to expose further said film.

9. In combination, a member having a reflective surface to be photographed, a substantially transparent photographic film having one side thereof positioned adjacent said surface, an electroluminescent panel mounted adjacent the other side of said film and coextending substantially therewith, said panel having electrodal coatings deposited respectively on opposed surfaces of said panel, the coating facing said film being relatively thinner to permit the passage of light from said panel to said film and the coating disposed on the other side of said panel being relatively thicker to prevent the loss of light and to reflect light from said panel to said film so that light passes through said film and is reflected at least partially from said surface to expose further said film, and circuit means for coupling said coatings to a source of alternating potential.

10. Means for photographing the interior reflective surface of a tubular conduit comprising a transparent tubular photographic film member adapted for insertion within said conduit and conforming substantially to the inner contour of said conduit, a supporting rod inserted within said tubular film and conforming substantially to the inner periphery thereof, said supporting rod having a layer of phosphor material disposed uniformly over its outer surface, and means for energizing said phosphor material so that light passes through said film and is reflected at least partially from said surface to expose further said film.

11. In combination, a member having a reflective surface to be photographed, a substantially transparent photographic film having one side thereof disposed adjacent said surface, a light source disposed on the other side of said film, and means for conducting light from said source to all portions of said other side of said film so that light passes through said film and is reflected at least partially from said surface to expose further said film.

12. In combination, a member having a reflective surface to be photographed, a sheet of substantially transparent supporting material, a layer of substantially transparent photographic emulsion disposed on one side of said supporting sheet, said one side being disposed adjacent said surface, and an area light source, said source coextending with said emulsion and being mounted adjacent the other side of said sheet so that light passes through said film and is reflected at least partially from said surface to expose further said film.

13. In combination, a member having a reflective surface to be photographed, a substantially transparent photographic film, one side of which being juxtaposed to said surface, a light source movably mounted adjacent the other side of said film, and means for moving said source to cause said source to scan all portions of said other side so that light passes through said film and is reflected at least partially from said surface to expose further said film.

14. Apparatus for photographing a reflective surface of a member, said apparatus comprising illuminating means disposed to illuminate said surface, and a light-transmitting photographic film positioned between said illuminating means and said surface so that said light passes through said film to said surface and is reflected from said surface toward said film, said film being disposed to be substantially coextensive with said surface.

15. Apparatus for photographing a reflective surface of a member, said apparatus comprising means illuminating at least a portion of said surface, a light-transmitting photographic film positioned between said illuminating means and said surface so that light from said illuminating means passes through said film to said surface portion and is reflected from said surface toward said film, said film being disposed to be substantially coextensive with said surface portion.

References Cited in the file of this patent

UNITED STATES PATENTS

| | | |
|---|---|---|
| 2,371,843 | Powers | Mar. 20, 1945 |
| 2,494,740 | Boucher | Jan. 17, 1950 |
| 2,523,306 | Kaiser et al. | Sept. 16, 1950 |
| 2,689,306 | Land | Sept. 14, 1954 |
| 2,754,427 | Berry | July 10, 1956 |
| 2,796,526 | Lusebrink | June 18, 1957 |